United States Patent
Hsiang et al.

(10) Patent No.: US 11,882,270 B2
(45) Date of Patent: Jan. 23, 2024

(54) METHOD AND APPARATUS FOR VIDEO CODING WITH CONSTRAINTS ON REFERENCE PICTURE LISTS OF A RADL PICTURE

(71) Applicant: MEDIATEK INC., Hsinchu (TW)

(72) Inventors: Shih-Ta Hsiang, Hsinchu (TW); Lulin Chen, San Jose, CA (US); Chih-Wei Hsu, Hsinchu (TW); Olena Chubach, San Jose, CA (US)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/341,879

(22) Filed: Jun. 8, 2021

(65) Prior Publication Data
US 2021/0385436 A1 Dec. 9, 2021

Related U.S. Application Data

(60) Provisional application No. 63/037,680, filed on Jun. 11, 2020, provisional application No. 63/036,528, filed on Jun. 9, 2020.

(51) Int. Cl.
*H04N 19/105* (2014.01)
*H04N 19/172* (2014.01)
*H04N 19/46* (2014.01)
*H04N 19/159* (2014.01)

(52) U.S. Cl.
CPC ......... *H04N 19/105* (2014.11); *H04N 19/159* (2014.11); *H04N 19/172* (2014.11); *H04N 19/46* (2014.11)

(58) Field of Classification Search
CPC .. H04N 19/105; H04N 19/159; H04N 19/172; H04N 19/46
See application file for complete search history.

(56) References Cited

U.S. PATENT DOCUMENTS

2021/0360290 A1* 11/2021 Seregin .................. H04N 19/70
2021/0368196 A1* 11/2021 Choi ..................... H04N 19/172

FOREIGN PATENT DOCUMENTS

WO    WO 2020/050752 A1    3/2020

OTHER PUBLICATIONS

Benjamin Bross, et al., Versatile Video Coding (Draft 9), JVET of ITU-T SG 16 WP 3 and ISO/IEC JTC 1/SC 29/WG 11, 18$^{th}$ Meeting, by teleconference, Apr. 15-24, 2020, Document JVET-R2001-vB, 527 pgs.

* cited by examiner

*Primary Examiner* — Kyle M Lotfi
(74) *Attorney, Agent, or Firm* — Oblon, McClelland, Maier & Neustadt, L.L.P.

(57) ABSTRACT

Method and apparatus for signaling or parsing constrained active entries in reference picture lists for multi-layer coding are disclosed. For the decoder side, when the current picture is a RADL (Random Access Decodable Leading) picture, reference picture list 0 or reference picture list 1 of the current picture is mandatorily required to contain no active entry corresponding to a RASL (Random Access Skipped Leading) picture with pps_mixed_nalu_types_in_pic_flag equal to 0 or a picture that precedes an associated IRAP (Intra Random Access Point) picture in decoding order, and wherein an active entry in the reference picture list 0 or the reference picture list 1 of the RADL picture can refer to a RASL picture with the pps_mixed_nalu_types_in_pic_flag equal to 1 and a referenced RASL picture either belongs to the same layer or a different layer than a layer containing the current picture which is the RADL picture.

5 Claims, 5 Drawing Sheets

METHOD AND APPARATUS FOR VIDEO CODING WITH CONSTRAINTS ON REFERENCE PICTURE LISTS OF A RADL PICTURE

CROSS REFERENCE TO RELATED APPLICATIONS

The present invention claims priority to U.S. Provisional Patent Application, Ser. No. 63/036,528, filed Jun. 9, 2020 and U.S. Provisional Patent Application, Ser. No. 63/037, 680, filed Jun. 11, 2020. The U.S. Provisional patent applications are hereby incorporated by reference in their entireties.

FIELD OF THE INVENTION

The present invention relates to video coding system. In particular, the present invention relates to constraints on reference picture lists for multi-layer coding.

BACKGROUND

High-efficiency video coding (HEVC) is the latest international video coding standard developed by the Joint Collaborative Team on Video Coding (JCT-VC) (Rec. ITU-T H.265 ISO/IEC 23008-2 version 3: High Efficiency Video Coding, April, 2015). FIG. 1 provides the block diagram of the HEVC encoding system. The input video signal is predicted from the reconstructed signal (136), which is derived from the coded picture regions using Inter/Intra prediction (110). The prediction residual signal is processed by a linear transform (118). The transform coefficients are quantized (120) and entropy coded (122) together with other side information in the bitstream. The reconstructed signal (128) is generated from the prediction signal and the reconstructed residual signal after inverse transform (126) on the de-quantized transform coefficients (124). The reconstructed signal is further processed by in-loop filtering (e.g., de-blocking filter (DF) 130 and NDFs 131) for removing coding artifacts. The decoded pictures are stored in the frame buffer (134) for predicting the future pictures in the input video signal.

In HEVC, a coded picture is partitioned into non-overlapped square block regions represented by the associated coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A CTU can be partitioned into multiple non-overlapped coding units (CUs) using the recursive quadtree (QT) structure to adapt to various local motion and texture characteristics. One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream. FIG. 2 illustrates an example of the block partitioning 210 (left) and its corresponding QT representation 220 (right). The solid lines indicate the CU boundaries and the dashed lines indicate the TU boundaries.

The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

The Joint Video Experts Team (JVET) of ITU-T SG16 WP3 and ISO/IEC JTC1/SC29/WG11 is currently in the process of establishing the next-generation video coding standard. Some promising new coding tools have been adopted into Versatile Video Coding (VVC) Draft in JVET-Q2001 (B. Bross J. Chen, S. Liu, "Versatile Video Coding (Draft 8)," Document of Joint Video Experts Team of ITU-T SG16 WP3 and ISO/IEC JTC1/SC29/WG11, JVET-Q2001, 17th Meeting: Brussels, BE, 7-17 Jan. 2020). In VVC Draft as specified in JVET-Q2001, a coded picture is partitioned into non-overlapped square block regions represented by CTUs, similar to HEVC. Each CTU can be partitioned into one or multiple smaller size coding units (CUs) by a quadtree with nested multi-type tree using binary and ternary split. The resulting CU partitions can be in square or rectangular shapes.

In the Versatile Video Coding (VVC) Draft as specified in JVET-Q2001, a tile is a sequence of CTUs that covers a rectangular region of a picture. The CTUs in a tile are scanned in raster scan order within that tile. A picture is divided into one or more tile rows and one or more tile columns. A slice consists of an integer number of complete tiles or an integer number of consecutive complete CTU rows within a tile of a picture. Two modes of slices are supported, namely the raster-scan slice mode and the rectangular slice mode, as indicated by the syntax element rect_slice_flag. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice. FIG. 3 and FIG. 4 provide examples of partitioning a picture into tiles and slices in raster-scan slice mode and rectangular slice mode, respectively. FIG. 3 illustrates an example where a picture with 18 by 12 luma CTUs is partitioned into 12 tiles and 3 raster-scan slices. Each CTU is indicated by a small rectugle enclosed by dashed lines, each tile is indicated by solid thin lines, and each slice is indicated by a gray area enclosed by thick lines. FIG. 4 illustrates an example where a picture with 18 by 12 luma CTUs is partitioned into 24 tiles and 9 rectangular slices.

VVC allows pictures coding in a subpicture level, where the subpicture is defined as a rectangular region of one or more (rectangular) slices within a picture. VVC may use multi-layer predictive coding. Prediction based video coding uses previously coded pictures as the reference pictures. In a multi-layered coding, the referenced picture may either belong to the same layer or a different layer than the layer containing the current picture and the referenced subpicture may have a different resolution than the current subpicture. FIG. 5 illustrates an example of picture structure using prediction coding, where the picture types include RADL (Random Access Skipped Leading) and RASL (Random Access Decodable Leading) pictures. As shown in FIG. 5, the coding order is different from the output order. The curved arrows between pictures indicate the prediction direction. VVC also allows mixing NAL unit types within a picture. FIG. 6 illustrates an example of mixing RASL and CRA (Clean Random Access) NAL unit types within a picture. The existence of allows mixing NAL unit types is indicated by the syntax element of mixed_nalu_types_in_pic_flag=1.

A RADL picture means a coded picture for which each VCL (Video Coding Layer) NAL (Network Abstraction Layer) unit has nal_unit_type equal to RADL_NUT. A RASL picture means a coded picture for which there is at least one VCL NAL unit with nal_unit_type equal to RASL_NUT and other VCL NAL units all have nal_unit_type equal to RASL_NUT or RADL_NUT.

BRIEF SUMMARY OF THE INVENTION

A method and apparatus for signaling or parsing constrained active entries in reference picture lists for multi-layer coding are disclosed. According to the method for the decoder side, a video bitstream associated with a current picture is received, where when the current picture is a RADL (Random Access Decodable Leading) picture, reference picture list 0 or reference picture list 1 of the current picture is mandatorily required to contain no active entry corresponding to a RASL (Random Access Skipped Leading) picture with pps_mixed_nalu_types_in_pic_flag equal to 0 or a picture that precedes an associated IRAP (Intra Random Access Point) picture in decoding order, and wherein an active entry in the reference picture list 0 or the reference picture list 1 of the RADL picture can refer to one RASL picture with the pps_mixed_nalu_types_in_pic_flag equal to 1 and a referenced RASL picture either belongs to the same layer or a different layer than a layer containing the current picture which is the RADL picture. The current picture is then decoded utilizing information comprising the active entries in the reference picture list 0 or the reference picture list 1.

In the encoder side, input data comprising a current picture is received. The current picture is encoded, where when the current picture is encoded as a RADL (Random Access Decodable Leading) picture, reference picture list 0 or reference picture list 1 of the current picture is mandatorily required to contain no active entry corresponding to a RASL (Random Access Skipped Leading) picture with pps_mixed_nalu_types_in_pic_flag equal to 0 or a picture that precedes an associated IRAP (Intra Random Access Point) picture in decoding order, and wherein an active entry in the reference picture list 0 or the reference picture list 1 of the RADL picture can refer to one RASL picture with the pps_mixed_nalu_types_in_pic_flag equal to 1 and a referenced RASL picture either belongs to the same layer or a different layer than a layer containing the current picture which is the RADL picture. A video bitstream comprising information of the active entries in the reference picture list 0 or the reference picture list 1 is generated.

Another method and apparatus for signaling or parsing constrained active entries in reference picture lists for multi-layer coding are disclosed. According to the method for the decoder side, a video bitstream associated with a current picture is received, where when a current subpicture of the current picture, with nuh_layer_id equal to a particular value layerId and subpicture index equal to a particular value subpicIdx and sps_subpic_treated_as_pic_flag[subPicIdx] equal to 1, is a RADL (Random Access Decodable Leading) subpicture, reference picture list 0 or reference picture list 1 associated with the current subpicture is mandatorily required to contain no active entry corresponding to a picture for which a value of nuh_layer_id may or may not be equal to layerId containing a RASL subpicture with the subpicture index equal to subpicIdx or a RASL (Random Access Skipped Leading) picture for which the value of nuh_layer_id is not equal to the layerId and a value of sps_num_subpics_minus1 is equal to 0 or a picture that precedes an associated IRAP (Intra Random Access Point) picture in decoding order. The current picture is then decoded utilizing information comprising the active entries in the reference picture list 0 or the reference picture list 1.

In the encoder side, input data comprising a current picture is received. The current picture is encoded, where when a current subpicture of the current picture, with nuh_layer_id equal to a particular value layerId and subpicture index equal to a particular value subpicIdx and sps_subpic_treated_as_pic_flag[subPicIdx] equal to 1, is a RADL (Random Access Decodable Leading) subpicture, reference picture list 0 or reference picture list 1 associated with the current subpicture is mandatorily required to contain no active entry corresponding to a picture for which a value of nuh_layer_id may or may not be equal to layerId containing a RASL subpicture with the subpicture index equal to subpicIdx or a RASL (Random Access Skipped Leading) picture for which the value of nuh_layer_id is not equal to the layerId and a value of sps_num_subpics_minus1 is equal to 0 or a picture that precedes an associated IRAP (Intra Random Access Point) picture in decoding order. A video bitstream comprising information of the active entries the reference picture list 0 or the reference picture list 1 is generated.

DETAILED DESCRIPTION OF THE INVENTION

Figure 1:
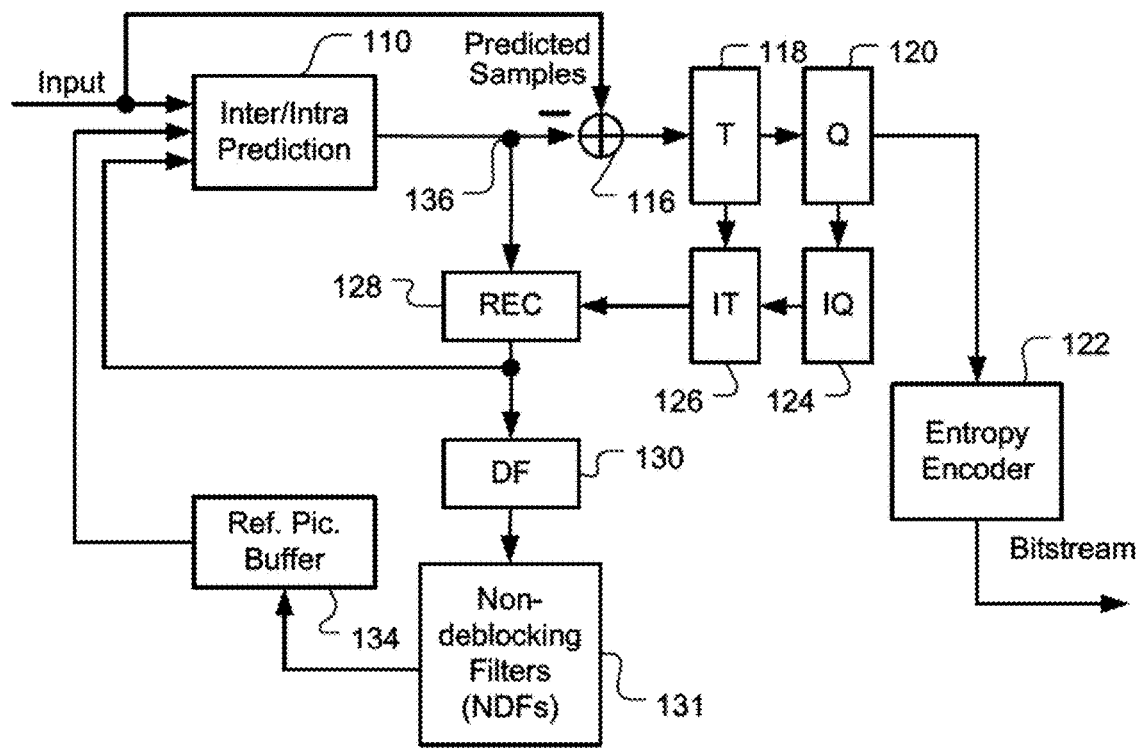
FIG. 1 illustrates an exemplary adaptive inter/intra video encoding system.
Figure 2:
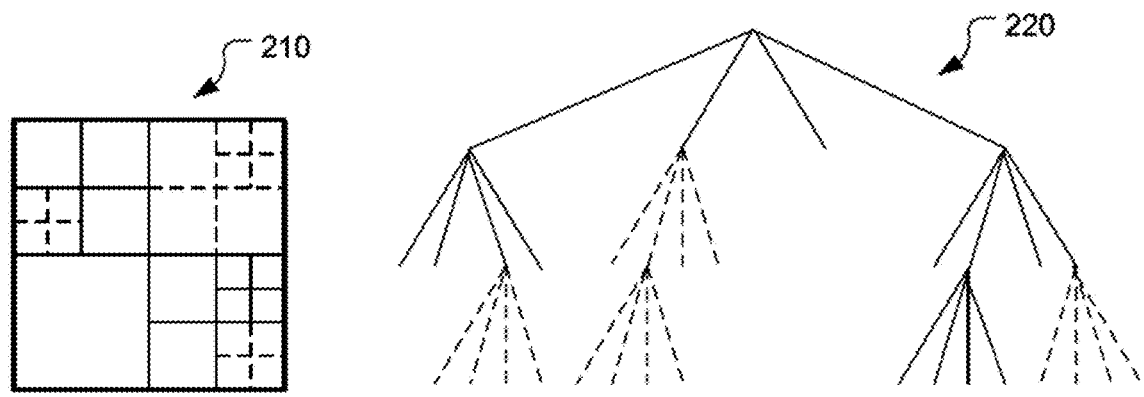
FIG. 2 illustrates an example of block partition, where a block partitioned result is shown on the left and a coding tree (also referred to as a partition tree structure) is shown on the right.
Figure 3:
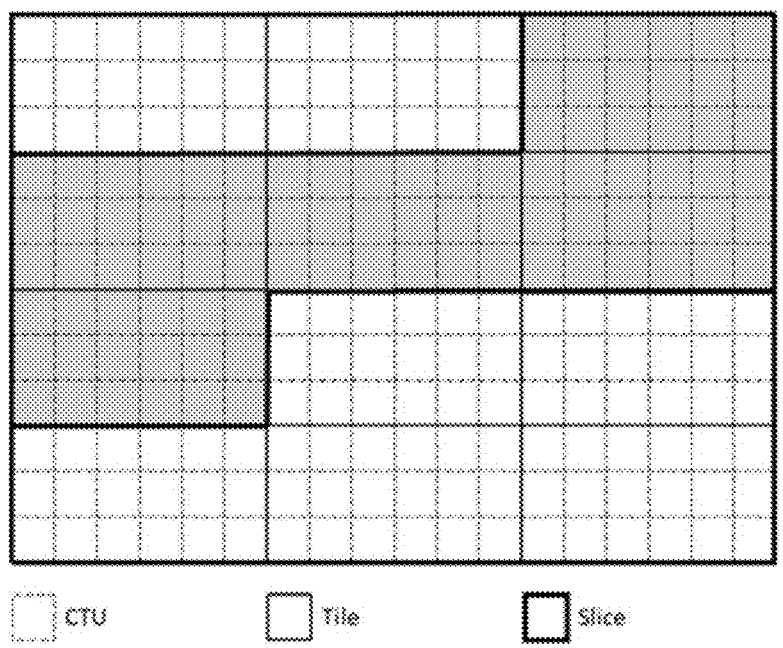
FIG. 3 illustrates an example of partitioning a picture into tiles and slices in the raster-scan slice mode, where the picture with 18 by 12 luma CTUs is partitioned into 12 tiles and 3 raster-scan slices.
Figure 4:
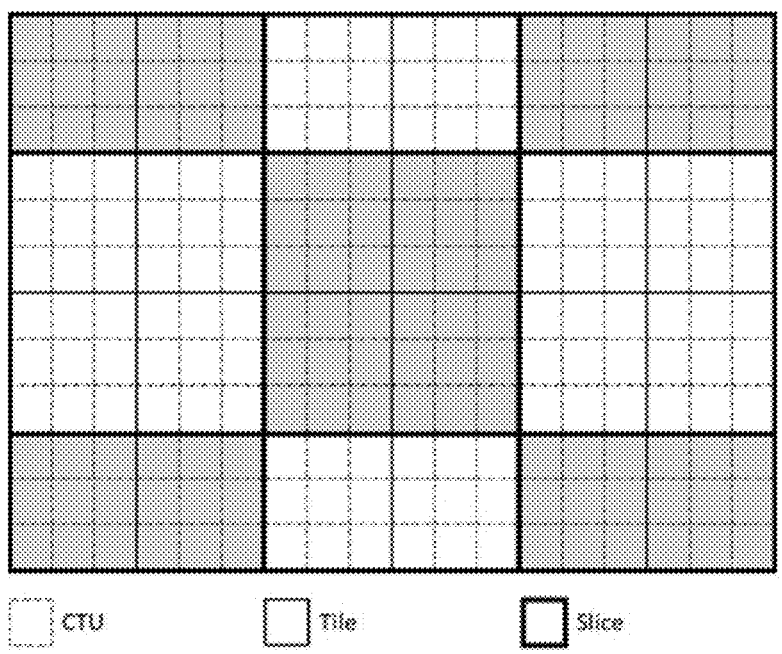
FIG. 4 illustrates an example of partitioning a picture into tiles and slices in the rectangular slice mode, where the picture with 18 by 12 luma CTUs is partitioned into 24 tiles and 9 rectangular slices.
Figure 5:
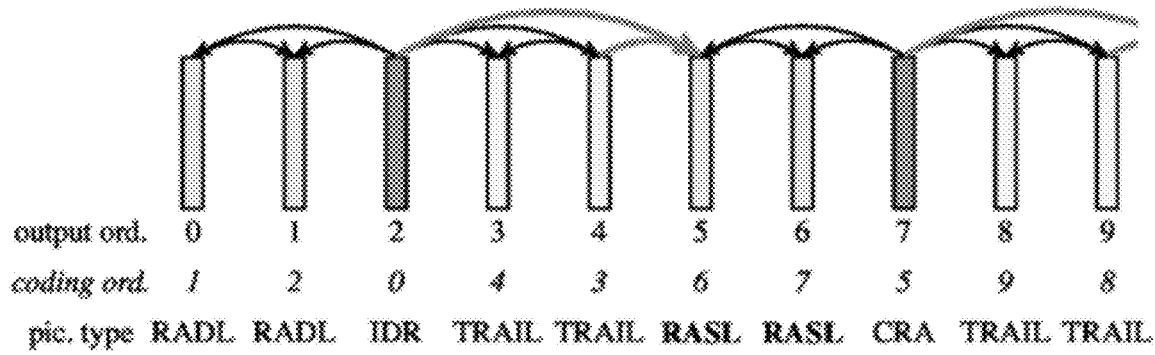
FIG. 5 illustrates an example of picture structure using prediction coding, where the picture types include RADL (Random Access Decodable Leading) and RASL (Random Access Skipped Leading) pictures.
Figure 6:
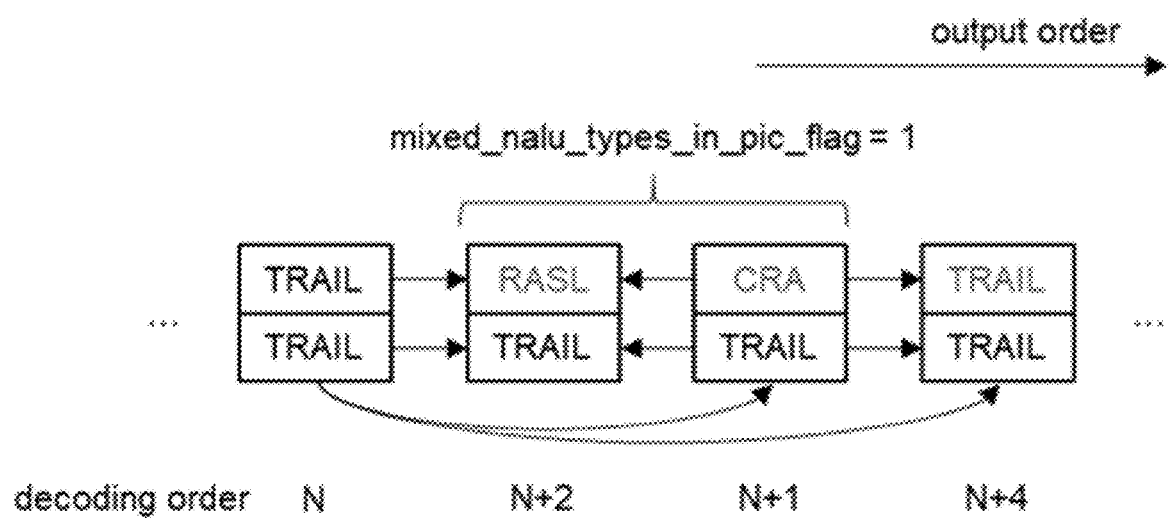
FIG. 6 illustrates an example of mixing RASL and CRA (Clean Random Access) NAL unit types within a picture. The existence of allows mixing NAL unit types is indicated by the syntax element of mixed_nalu_types_in_pic_flag=1.

The following description is of the best-contemplated mode of carrying out the invention. This description is made for the purpose of illustrating the general principles of the invention and should not be taken in a limiting sense. The scope of the invention is best determined by reference to the appended claims.

In layered coding, there may be more than one layer and picture or subpicture dependency across layers. Furthermore, in multi-layered coding, the referenced picture may either belong to the same layer or a different layer than the layer containing the current picture, and the referenced subpicture may have a different resolution than the current subpicture. In JVET-R2001, the constraints as the above item A and item B on the active entry in the reference picture lists of a RADL picture or a RADL subpicture are not properly set. Accordingly, in this invention, the constraints as the table A and table B below against the item A and item B on the active entry in the reference picture lists of a RADL picture and a RADL subpicture with improved constraint are disclosed.

In a revised JVET-R2001 as disclosed in JVET-S0152 (Ye-Kui Wang, "AHG2: Editorial input of a text integration for the May 2020 HLS AHG meeting outcome", Joint Video Experts Team of ITU-T SG16 WP3 and ISO/IEC JTC1/SC29/WG11, JVET-Q2001, 19th Meeting: by teleconference, 22 June-1 Jul. 2020, Document: JVET-S0152), the revised VVC draft specifies requirements of bitstream conformance with constraints on reference picture lists. The recommended text by the ad hoc group experts for a RADL picture are as follows:

A. When the current picture is a RADL picture, there shall be no active entry in RefPicList[0] or RefPicList[1] that is any of the following:
  A RASL picture with pps_mixed_nalu_types_in_pic_flag is equal to 0 NOTE 4—This means that an active entry of the RPLs of a RADL picture can refer to a RASL picture with pps_mixed_nalu_types_in_pic_flag equal to 1. However, when decoding starts from the associated CRA picture, such a RADL picture can still be correctly decoded, because the RADL subpicture(s) in that referenced RASL picture would be correctly decoded, as the RADL picture would only refer to the RADL subpictures in the referenced RASL picture, as imposed by the next constraint that disallows RADL subpictures referring to a RASL subpicture.
  A picture that precedes the associated IRAP picture in decoding order B. When the current subpicture, with nuh_layer_id equal to a particular value layerId and subpicture index equal to a particular value subpicIdx, is a RADL subpicture, there shall be no active entry in RefPicList[0] or RefPicList[1] that is any of the following:
  A picture with nuh_layer_id equal to layerId containing a RASL subpicture with subpicture index equal to subpicIdx
  A picture that precedes the picture containing the associated IRAP subpicture in decoding order In the above recommended texts, item A corresponds to constraints on a RADL picture and item B corresponds to constraints on a RADL subpicture. An IRAP picture means an intra random access point picture, for which all VCL NAL units have the same value of nal_unit_type in the range of IDR_W_RADL to CRA_NUT, inclusive. In the above constraints, nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use.

In the above constraints, RPLs corresponds to reference picture lists. pps_mixed_nalu_types_in_pic_flag is a flag in PPS (picture parameter set) indicating whether mixed NAL units is used in the picture, where pps_mixed_nalu_types_in_pic_flag equal to 1 specifies that each picture referring to the PPS has more than one VCL NAL unit and the VCL NAL units do not have the same value of nal_unit_type. pps_mixed_nalu_types_in_pic_flag equal to 0 specifies that each picture referring to the PPS has one or more VCL NAL units and the VCL NAL units of each picture referring to the PPS have the same value of nal_unit_type.

An IRAP picture does not use inter prediction in its decoding process, and may be a CRA picture or an IDR picture. The first picture in the bitstream in decoding order must be an IRAP or GDR picture. Provided the necessary parameter sets are available when they need to be referenced, the TRAP picture and all subsequent non-RASL pictures in the CLVS in decoding order can be correctly decoded without performing the decoding process of any pictures that precede the IRAP picture in decoding order.

The value of pps_mixed_nalu_types_in_pic_flag for an IRAP picture is equal to 0. When pps_mixed_nalu_types_in_pic_flag is equal to 0 for a picture, and any slice of the picture has nal_unit_type in the range of IDR_W_RADL to CRA_NUT, inclusive, all other slices of the picture have the same value of nal_unit_type, and the picture is known to be an TRAP picture.

In one embodiment, the constraints on the active entry in the reference picture lists of a RADL picture with improved constraint are shown as follows:

A. When the current picture is a RADL picture, there shall be no active entry in RefPicList[0] or RefPicList[1] that is any of the following:
  A RASL picture with pps_mixed_nalu_types_in_pic_flag is equal to 0 NOTE 4—This means that an active entry of the RPLs of a RADL picture can refer to a RASL picture with pps_mixed_nalu_types_in_pic_flag equal to 1 and the referenced RASL picture may either belong to the same layer or a different layer than the layer containing the current RADL picture. However, when decoding starts from the associated CRA picture, such a RADL picture can still be correctly decoded, because the RADL subpicture(s) in that referenced RASL picture with sps_subpic_treated_as_pic_flag equal to 1 would be correctly decoded, as the RADL picture would only refer to the RADL subpictures in the referenced RASL picture, as imposed by the next constraint that disallows RADL subpictures referring to a RASL subpicture.
  A picture that precedes the associated IRAP picture in decoding order B. When the current subpicture, with nuh_layer_id equal to a particular value layerId and subpicture index equal to a particular value subpicIdx and sps_subpic_treated_as_pic_flag[subPicIdx] equal to 1, is a RADL subpicture, there shall be no active entry in RefPicList[0] or RefPicList[1] that is any of the following:
  A picture with nuh_layer_id equal to layerId containing a RASL subpicture with subpicture index equal to subpicIdx
  A picture in a different layer containing a RASL subpicture corresponding to the current RADL subpicture.
  A picture that precedes the picture containing the associated IRAP subpicture in decoding order The additional texts added to the constraints in JVET-R2001 are shown in Italic style. In particular, in Note 4, additional text, "and the referenced RASL picture may either belong to the same layer or a different layer than the layer containing the current RADL picture" for the case of the current picture being a RADL picture is added so that the constraint becomes "an active entry of the RPLs of a RADL picture can refer to a RASL picture with pps_mixed_nalu_types_in_pic_flag equal to 1 and the referenced RASL picture may either belong to the same layer or a different layer than the layer containing the current RADL picture".

Furthermore, for Note 4, additional text, "with sps_subpic_treated_as_pic_flag equal to 1" for the case of the current picture being a RADL picture is added so that the constraint becomes "the RADL subpicture(s) in that referenced RASL picture with sps_subpic_treated_as_pic_flag equal to 1 would be correctly decoded".

Regarding the constraints on a current subpicture, additional text, "and sps_subpic_treated_as_pic_flag[subPicIdx] equal to 1" is added so that the constraint becomes "subpicture index equal to a particular value subpicIdx and sps_subpic_treated_as_pic_flag[subPicIdx] equal to 1".

In addition, the table B of no active entry in RefPicList[0] or RefPicList[1] includes an additional element, "A picture in a different layer containing a RASL subpicture corresponding to the current RADL subpicture".

In the constraints mentioned above, sps_subpic_treated_as_pic_flag[i] is a flag in SPS (sequence parameter set) indicating whether a subpicture is treated as a picture, where sps_subpic_treated_as_pic_flag[i] equal to 1 specifies that the i-th subpicture of each coded picture in the CLVS is treated as a picture in the decoding process excluding in-loop filtering operations. sps_subpic_treated_as_pic_flag[i] equal to 0 specifies that the i-th subpicture of each coded picture in the CLVS is not treated as a picture in the decoding process excluding in-loop filtering operations. When not present, the value of sps_subpic_treated_as_pic_flag[i] is inferred to be equal to 1.

While the specific syntaxes, such as pps_mixed_nalu_types_in_pic_flag and sps_subpic_treated_as_pic_flag[i] as defined in JVET-R2001 are used, other syntaxes with the same or similar definition can be used. The present invention is not limited to these specific syntaxes.

In another embodiment, the constraints on the active entry in the reference picture lists of a RADL picture with improved constraints are shown as follows:
A. When the current picture is a RADL picture, there shall be no active entry in RefPicList[0] or RefPicList[1] that is any of the following:
  A RASL picture with pps_mixed_nalu_types_in_pic_flag is equal to 0 NOTE 4—This means that an active entry of the RPLs of a RADL picture can refer to a RASL picture with pps_mixed_nalu_types_in_pic_flag equal to 1 and the referenced RASL picture may either belong to the same layer or a different layer than the layer containing the current RADL picture. However, when decoding starts from the associated CRA picture, such a RADL picture can still be correctly decoded, because the RADL subpicture(s) in that referenced RASL picture with sps_subpic_treated_as_pic_flag equal to 1 would be correctly decoded, as the RADL picture would only refer to the RADL subpictures in the referenced RASL picture, as imposed by the next constraint that disallows RADL subpictures referring to a RASL subpicture.
  A picture that precedes the associated IRAP picture in decoding order
B. When the current subpicture, with nuh_layer_id equal to a particular value layerId and subpicture index equal to a particular value subpicIdx and sps_subpic_treated_as_pic_flag[subPicIdx] equal to 1, is a RADL subpicture, there shall be no active entry in RefPicList[0] or RefPicList[1] that is any of the following:
  A picture/*with nuh_layer_id equal to layerId*/for which the value of nuh_layer_id may or may not be equal to layerId containing a RASL subpicture with subpicture index equal to subpicIdx
  A RASL picture for which the value of nuh_layer_id is not equal to layerId and the value of sps_num_subpics_minus1 is equal to 0.
  A picture that precedes the picture containing the associated IRAP subpicture in decoding order In the above constraints, the additional texts added to the constraints in JVET-R2001 are shown in Italic style and deleted texts are shown between a pair of delimiters, "/*" and "*/".

For the case of the current picture being a RADL picture, the changes from JVET-R2001 are the same as the previous embodiment.

Regarding the constraints on a current subpicture, additional text, "and sps_subpic_treated_as_pic_flag[subPicIdx] equal to 1" is added so that the constraint becomes "subpicture index equal to a particular value subpicIdx and sps_subpic_treated_as_pic_flag[subPicIdx] equal to 1".

In addition, the first element in the table B of no active entry in RefPicList[0] or RefPicList[1] is modified to, "A picture for which the value of nuh_layer_id may or may not be equal to layerId containing a RASL subpicture with subpicture index equal to subpicIdx".

Also, the table B of no active entry in RefPicList[0] or RefPicList[1] includes an additional element, "A RASL picture for which the value of nuh_layer_id is not equal to layerId and the value of sps_num_subpics_minus1 is equal to 0".

In the above constraints, sps_num_subpics_minus1 plus 1 specifies the number of subpictures in each picture in the CLVS. The value of sps_num_subpics_minus1 shall be in the range of 0 to Ceil (sps_pic_width_max_in_luma_samples÷CtbSizeY)*Ceil (sps_pic_height_max_in_luma_samples÷CtbSizeY)−1, inclusive. When not present, the value of sps_num_subpics_minus1 is inferred to be equal to 0. Ceil ( ) is a ceiling function.

While the specific syntaxes, such as pps_mixed_nalu_types_in_pic_flag, sps_subpic_treated_as_pic_flag[i], nuh_layer_id and sps_num_subpics_minus1 as defined in JVET-R2001 are used, other syntaxes with the same or similar definition can be used. The present invention is not limited to these specific syntaxes.

Any of the foregoing proposed methods can be implemented in encoders and/or decoders. For example, any of the proposed methods can be implemented in a high-level syntax encoding module of an encoder, and/or a high-level syntax decoding module of a decoder. Alternatively, any of the proposed methods can be implemented as a circuit integrated to the high-level syntax encoding module of the encoder and/or the high-level syntax decoding module of the decoder. Any of the foregoing proposed methods can also be implemented in image encoders and/or decoders, wherein the resulting bitstream corresponds to one coded frame only using intra-picture prediction.

Figure 7:
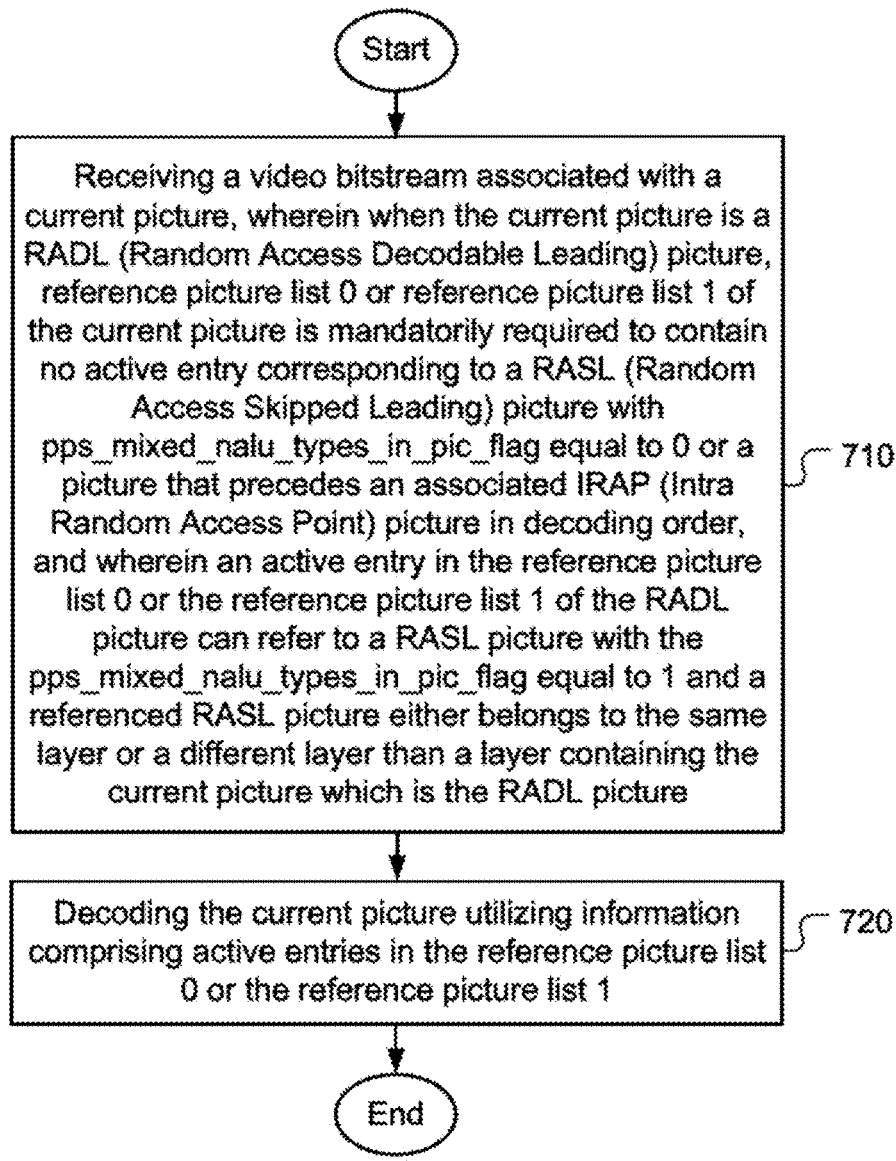
FIG. 7 illustrates a flowchart of an exemplary video decoding system according to an embodiment of the present invention, where a current picture is a RADL (Random Access Decodable Leading) picture.

FIG. 7 illustrates a flowchart of an exemplary video decoding system according to an embodiment of the present invention, where a current picture is a RADL (Random Access Decodable Leading) picture. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, a video bitstream associated with a current picture is received in step 710, wherein when the current picture is a RADL (Random Access Decodable Leading) picture, reference picture list 0 or reference picture list 1 of the current picture is mandatorily required to contain no active entry corresponding to a RASL (Random Access Skipped Leading) picture with pps_mixed_nalu_types_in_pic_flag equal to 0 or a picture that precedes an associated IRAP (Intra Random Access Point) picture in decoding order, and wherein an active entry in the reference picture list 0 or the reference picture list 1 of the RADL picture can refer to a RASL picture with the pps_mixed_nalu_types_in_pic_flag equal to 1 and a referenced RASL picture either belongs to the same layer or a different layer than a layer containing the current picture which is the RADL picture. The current picture is decoded utilizing information comprising the active entries in the reference picture list 0 or the reference picture list 1 in step 720.

A flowchart of an exemplary video encoding system corresponding to the decoder in FIG. 7 can be derived accordingly.

Figure 8:
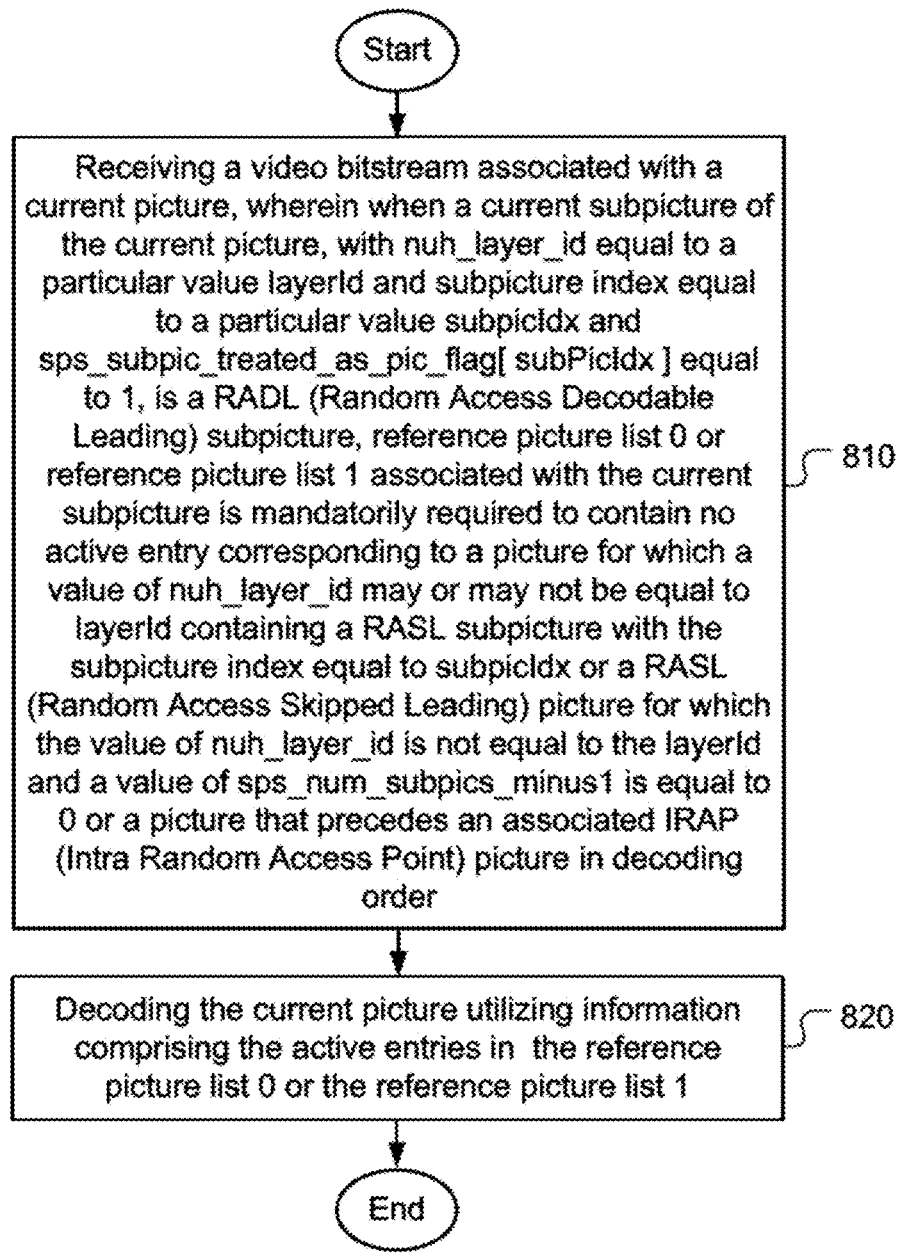
FIG. 8 illustrates a flowchart of an exemplary video decoding system for a subpicture according to an embodiment of the present invention.

FIG. 8 illustrates a flowchart of an exemplary video decoding system for a subpicture according to an embodiment of the present invention. According to this method, a video bitstream associated with a current picture is received in step 810, wherein when a current subpicture of the current picture, with nuh_layer_id equal to a particular value layerId and subpicture index equal to a particular value subpicIdx and sps_subpic_treated_as_pic_flag[subPicIdx] equal to 1, is a RADL (Random Access Decodable Leading) subpicture, reference picture list 0 or reference picture list 1 associated with the current subpicture is mandatorily required to contain no active entry corresponding to a picture for which a value of nuh_layer_id may or may not be equal to layerId containing a RASL subpicture with the subpicture index equal to subpicIdx or a RASL (Random Access Skipped Leading) picture for which the value of nuh_layer_id is not equal to the layerId and a value of sps_num_subpics_minus1 is equal to 0 or a picture that precedes an associated IRAP (Intra Random Access Point) picture in decoding order. The current picture is decoded utilizing information comprising the active entries in the reference picture list 0 or the reference picture list 1 in step 820.

A flowchart of an exemplary video encoding system corresponding to the decoder in FIG. 8 can be derived accordingly.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for decoding a video sequence, the method comprising:
   receiving a video bitstream associated with a current picture, wherein when a current subpicture of the current picture, with nuh_layer_id equal to a particular value layerId and subpicture index equal to a particular value subpicIdx, is a RADL (Random Access Decodable Leading) subpicture, reference picture list 0 or reference picture list 1 associated with the current subpicture is mandatorily required to contain no active entry corresponding to:
- a picture for which a value of nuh_layer_id is not equal to layerId containing a RASL (Random Access Skipped Leading) subpicture with the subpicture index equal to subpicIdx; or
- a RASL picture for which the value of nuh_layer_id is not equal to the layerId and a value of sps_num_subpics_minus1 is equal to 0;

and decoding the current subpicture utilizing information comprising the active entries in the reference picture list 0 or the reference picture list 1.

2. An apparatus for decoding a video sequence, the apparatus comprising one or more electronic circuits or processors arranged to:

receive a video bitstream associated with a current picture, wherein when a current subpicture of the current picture, with nuh_layer_id equal to a particular value layerId and subpicture index equal to a particular value subpicIdx, is a RADL (Random Access Decodable Leading) subpicture, reference picture list 0 or reference picture list 1 associated with the current subpicture is mandatorily required to contain no active entry corresponding to:
- a picture for which a value of nuh_layer_id is not equal to layerId containing a RASL (Random Access Skipped Leading) subpicture with the subpicture index equal to subpicIdx; or
- a RASL picture for which the value of nuh_layer_id is not equal to the layerId and a value of sps_num_subpics_minus1 is equal to 0:

and decode the current subpicture utilizing information comprising the active entries in the reference picture list 0 or the reference picture list 1.

3. A method for encoding a video sequence, the method comprising:

receiving input data comprising a current picture;

encoding the current picture, wherein when a current subpicture of the current picture, with nuh_layer_id equal to a particular value layerId and subpicture index equal to a particular value subpicIdx, is a RADL (Random Access Decodable Leading) subpicture, reference picture list 0 or reference picture list 1 associated with the current subpicture is mandatorily required to contain no active entry corresponding to;
- a picture for which a value of nuh_layer_id is not equal to layerId containing a RASL (Random Access Skipped Leading) subpicture with the subpicture index equal to subpicIdx; or
- a RASL picture for which the value of nuh_layer_id is not equal to the layerId and a value of sps_num_subpics_minus1 is equal to 0;

and generating a video bitstream comprising information of the active entries in the reference picture list 0 or the reference picture list 1.

4. A method for decoding a video sequence, the method comprising:

receiving a video bitstream associated with a current picture, wherein when the current picture is a RADL (Random Access Decodable Leading) picture, reference picture list 0 or reference picture list 1 of the current picture is mandatorily required to contain no active entry corresponding to:
- a RASL (Random Access Skipped Leading) picture with pps_mixed_nalu_types_in_pic_flag equal to 0; or
- a picture that precedes an associated IRAP (Intra Random Access Point) picture in decoding order, and wherein an active entry in the reference picture list 0 or the reference picture list 1 of the RADL picture refers to a RASL picture with the pps_mixed_nalu_types_in_pic_flag equal to 1 and a referenced RASL picture either belongs to the same layer or a different layer than a layer containing the current picture which is the RADL picture; and decoding the current picture utilizing information comprising the active entries in the reference picture list 0 or the reference picture list 1.

5. A method for encoding a video sequence, the method comprising:

receiving input data comprising a current picture, wherein when the current picture is a RADL (Random Access Decodable Leading) picture, reference picture list 0 or reference picture list 1 of the current picture is mandatorily required to contain no active entry corresponding to:
- a RASL (Random Access Skipped Leading) picture with pps_mixed_nalu_types_inpic_flag equal to 0; or
- a picture that precedes an associated IRAP (Intra Random Access Point) picture in decoding order, and wherein an active entry in the reference picture list 0 or the reference picture list 1 of the RADL picture refers to a RASL picture with the pps_mixed_nalu_types_inpic_flag equal to 1 and a referenced RASL picture either belongs to the same layer or a different layer than a layer containing the current picture which is the RADL picture; and encoding the current picture utilizing information comprising the active entries in the reference picture list 0 or the reference picture list 1.

* * * * *